Sept. 13, 1932.  E. V. FRANCIS  1,876,904
TROLLEY CONVEYER
Filed May 11, 1931    4 Sheets-Sheet 1
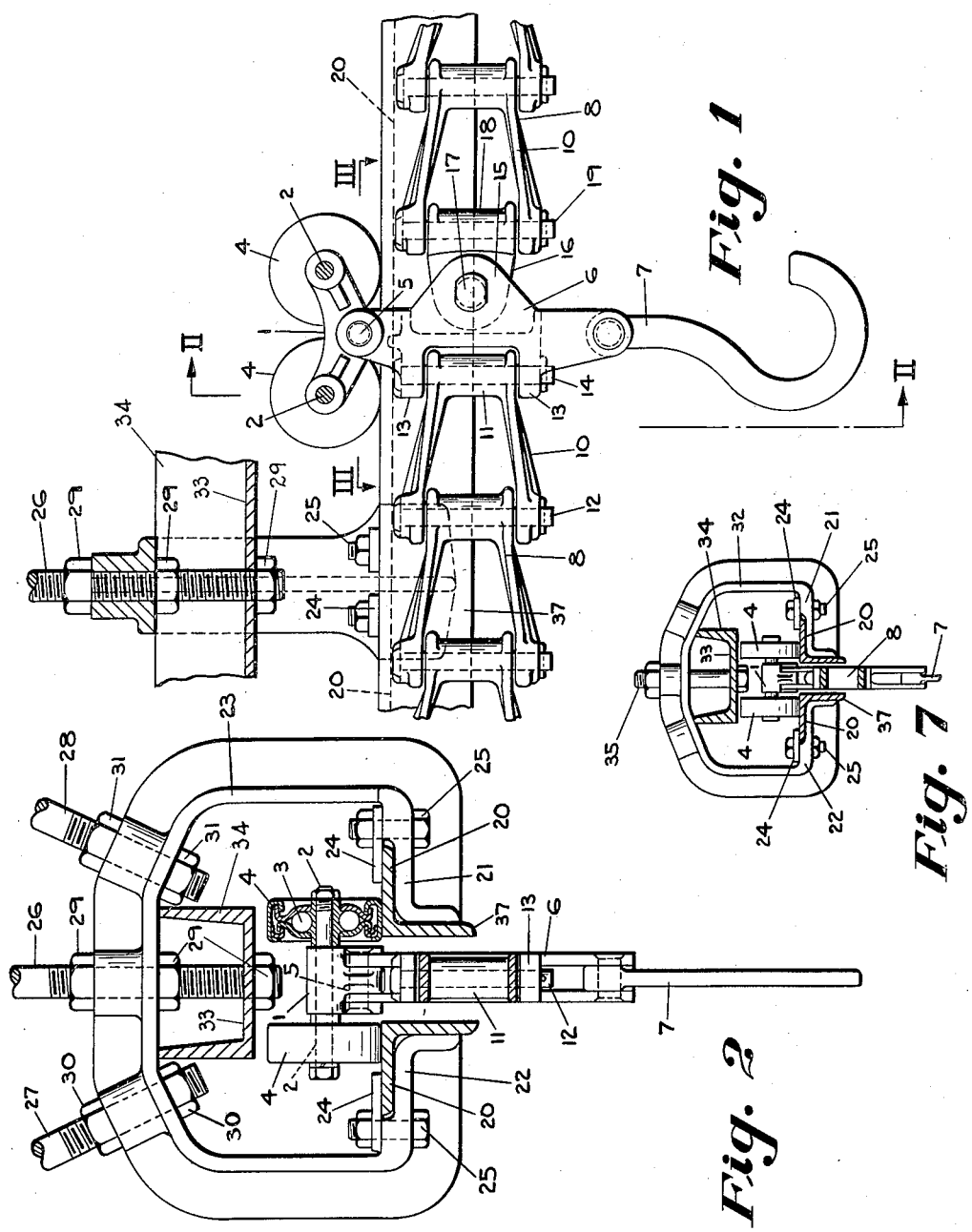
INVENTOR
Earle V. Francis Sept. 13, 1932.  E. V. FRANCIS  1,876,904
TROLLEY CONVEYER
Filed May 11, 1931  4 Sheets-Sheet 2

INVENTOR
Earle V. Francis
by Cushman, Bryant Darby
attys

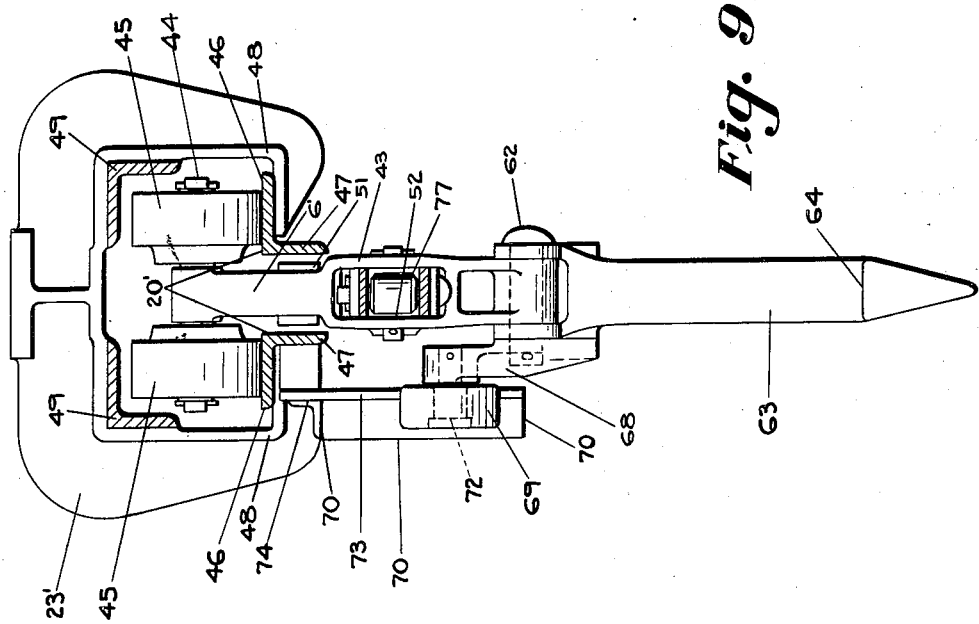

Sept. 13, 1932.  E. V. FRANCIS  1,876,904
TROLLEY CONVEYER
Filed May 11, 1931  4 Sheets-Sheet 4
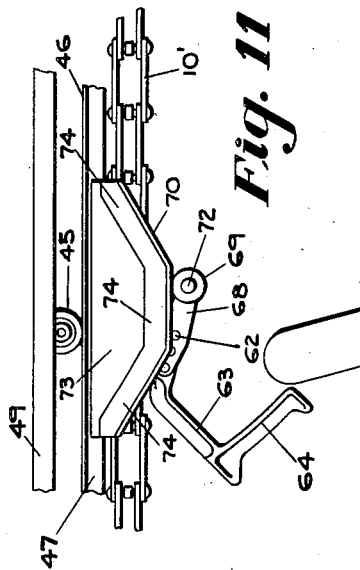
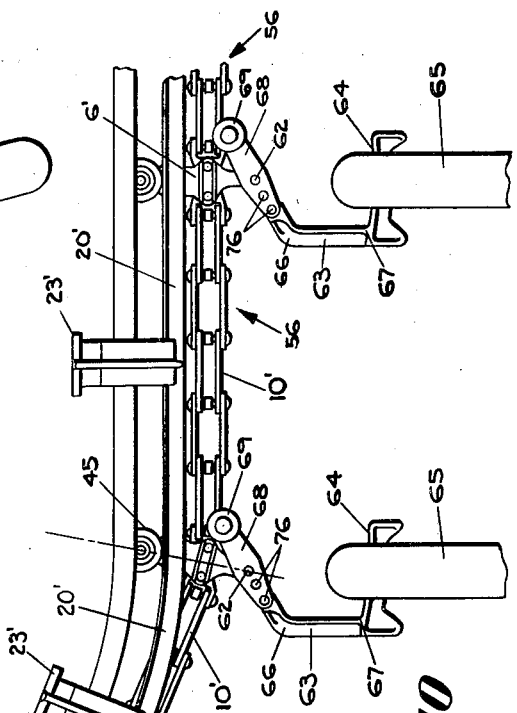
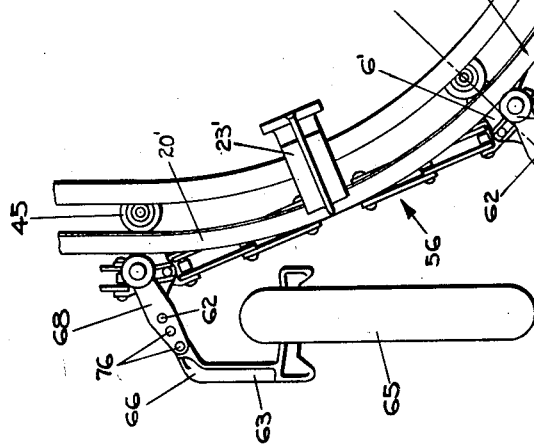
INVENTOR
Earle V. Francis.

Patented Sept. 13, 1932

1,876,904

UNITED STATES PATENT OFFICE

EARLE V. FRANCIS, OF COLUMBUS, OHIO, ASSIGNOR TO THE JEFFREY MANUFACTURING COMPANY, OF COLUMBUS, OHIO, A CORPORATION OF OHIO

TROLLEY CONVEYER

Application filed May 11, 1931. Serial No. 536,614.

The present invention relates to certain new and useful improvements in trolley conveyers of the class comprising a series of wheeled carriages connected in an endless train by suitable lengths of a flexible draft element, supported upon and adapted to travel along an overhead trackway, and provided with means for the suspension beneath the trackway of loads for transportation therealong.

Trolley conveyers of the class to which my present invention relates are commonly used in such institutions as automobile factories and the like, for the transportation of machine parts from the points of production to points of use, and the trackways upon which these conveyers travel meander about the establishment with numerous curves of various radii in horizontal planes and with less frequent curves in vertical planes to pass from one floor to another or to avoid a roadway or other obstruction.

One of the objects of this invention is the provision of improved and efficient means for guarding the wheeled carriage against undue movement from such overhead trackway while traveling along the same particularly in upright planes.

Another object of the invention is the provision for maintaining such a wheeled carriage in association with its trackway by preventing the same from moving laterally therefrom or moving off the same unduly while such carriage is traveling in upright planes along curved portions of the trackway.

A further object of the invention is the provision of improved means for supporting overhead trackway of trolley conveyers to facilitate and simplify its erection in the most convenient places available.

Other objects of the invention will appear hereinafter, the novel features and combinations being set forth in the appended claims.

In the accompanying drawings:—

Fig. 1 is a side elevation of one unit of my improved trolley conveyer, certain parts being broken away to reveal other parts.

Fig. 2 is a sectional view taken along the line II—II of Fig. 1.

Fig. 7 is a sectional view taken along the line VII—VII of Fig. 6.

Fig. 8 is a side elevation of a modified trolley carriage.

Fig. 9 is a transverse sectional view of a modified trackway with a trolley carriage associated therewith;

Fig. 10 is an elevational view of a portion of a trolley conveyer embodying my improvements shown in Fig. 9;

Fig. 11 illustrates the mechanism for automatically discharging the load from the material carrying elements; and Fig. 12 is a sectional plan view taken on the line 12—12 of Fig. 8.

Like numerals refer to similar parts in the several figures.

Figure 4:
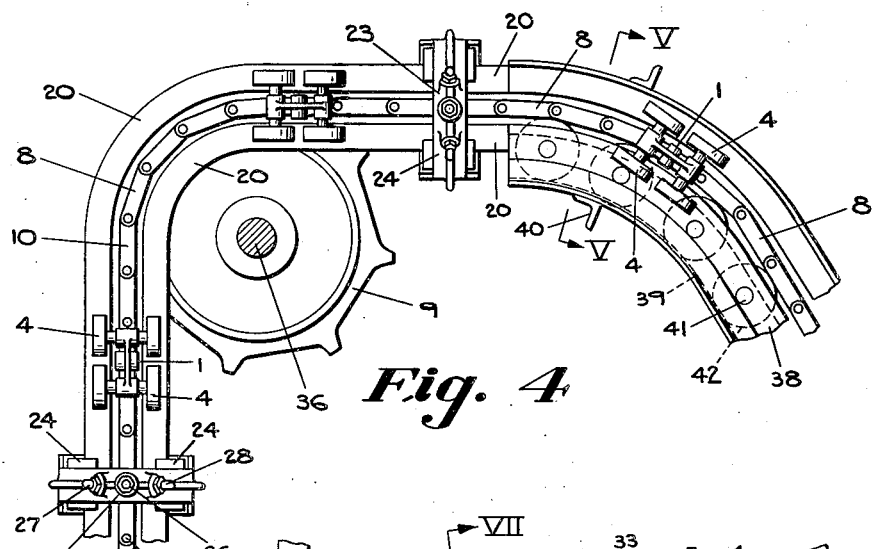
Fig. 4 is a fragmentary plan view of a conveyer constructed according to my present invention, illustrating two methods of guiding the conveyer elements around curves in horizontal planes.

In Figs. 1 and 2 of the drawings I have shown one of the carrier units of the preferred embodiment of my invention. As here illustrated the carrier comprises a horizontally disposed frame member 1 at each end of which is fixed a transversely extending axle 2. Positioned upon the projecting ends of the axles 2 are anti-friction journal bearings 3 upon which are mounted for free rotation the track-wheels 4 which are adapted to rest upon and travel along the trackway of the conveyer. Fixed in the frame casting 1 midway between the axles 2 is a transversely extending pivot pin 5 from which depends the trolley frame member 6 which is preferably a relatively thin casting the lateral sides of which are flat and parallel. To the lower end of the frame casting 6 is pivotally attached a load supporting member 7 which may be of any preferred construction suitable to the requirements of the material which is to be transported.

The trolley carriage thus formed is adapted to be connected into an endless train of similar carriages by suitable lengths of chain 8 which are disposed for flexure in horizontal planes in order that they may be engaged and actuated by suitable sprocket wheels 9 disposed in horizontal planes wherein they avoid the trackway and the suspended load of the conveyer. The chain sections are preferably made up of a series of links each having two spaced apart longitudinally extending side bars 10 connected at one end by the integrally formed barrel member 11 through which extends the pintle 12 to connect the side bars 10 of one link with the barrel element 11 of the following link. Formed on the trailing end of the frame casting 6 are two horizontal lugs 13 suitably spaced vertically to receive the barrel member 11 of the terminal link of the following or trailing chain section, and these parts are connected together by a vertically disposed pintle 14 which extends through suitable apertures in the lugs 13 and barrel 11. Formed on the advancing edge of the frame casting 6 are two laterally disposed lugs 15 spaced apart horizontally a suitable distance to receive the swivel link 16 to which they are connected by a transversely extending pintle 17. At its forward end the swivel link 16 is formed with a barrel member 18 similar to the barrel members of the chain links and adapted to engage the side bars 10 of the terminal link of the advancing or propelling chain section, these parts being connected together by a suitable pintle 19. The proportions of these parts are such that the lateral surfaces of the frame casting 6 lie in the vertical longitudinal bounding planes of the chain 8 of which the casting 6 and swivel 16, taken together, constitute a link having uniform pitch with the other links of the chain, and adapted to work over the sprocket wheel 9 by which the conveyer is actuated. By the horizontal pivotal connection of the frame member with the advancing section of the actuating chain 8 there is afforded sufficient flexibility in vertical planes to permit the easy passage of the train of carriers around vertical curves, while the vertical pivotal connection with the trailing chain section tends to maintain the frame casting 6 in substantially radial relation with the track rails of the vertical curves.

Figure 6:
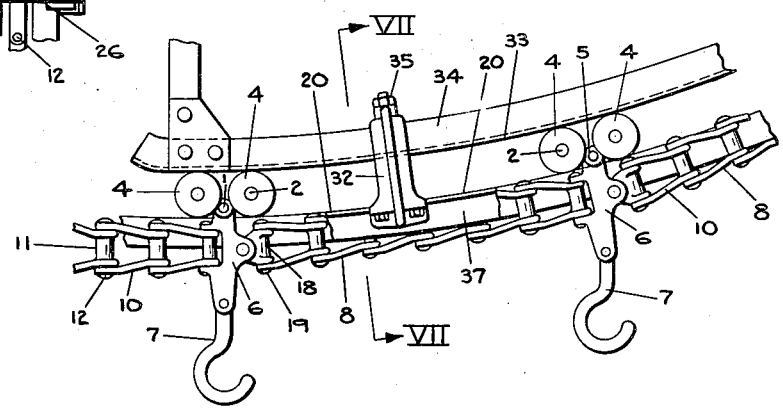
Fig. 6 is a fragmentary side elevation, partly in section, showing a conveyer constructed according to my present invention, illustrating a curve in a vertical plane.
Figure 3:
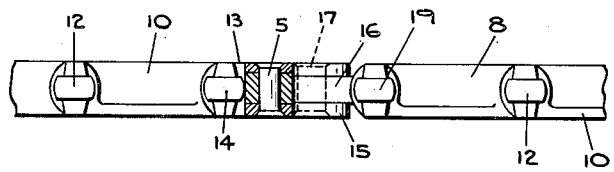
Fig. 3 is a sectional view taken along the line III—III of Fig. 1.

The trolley carriages above described are adapted to travel along any suitable trackway, but in the drawings I have shown a preferred construction whereby is attained improved convenience and efficiency of operation. Throughout the major portion of the conveyer the trackway comprises two parallel angle bars the flanges 20 of which project horizontally outward to afford a supporting surface along which the track-wheels 4 may travel. The horizontal flanges 20 of the track angles rest upon the inwardly projecting ends 21 and 22 of a C-shaped yoke casting 23 to which they are secured by clamping plates 24 and bolts 25. The yoke casting 23 is provided with upwardly diverging bosses which are pierced to receive the diverging suspension and bracing rods 26, 27 and 28. Screw threaded to the rods 26, 27 and 28, are nuts 29, 30 and 31 by the manipulation of which the alignment of the track angle may be adjusted.

Where the trackway changes direction additional supports are commonly provided composed of structural shapes built into the structure of the factory building. At such points, however, the track members are preferably secured in working relation by yoke castings 32 similar to the supporting yoke castings 23, as illustrated in Figs. 6 and 7. On vertical curves the tension of the propelling chain 8 tends to lift the track wheels 4 from the rail flanges 20, and in order to maintain these parts in working relation I have provided, at such curves, guard rails 33 immediately above the path of the track wheels 4 in position to engage said wheels when lifted from the track rails. The guard rail 33 is preferably formed of a channel bar the upwardly projecting flanges 34 of which engage the yoke casting 32 and are held in contact therewith by the clamping bolt 35 which projects through suitable apertures in the yoke casting and in the web of the guard rail.

Figure 5:
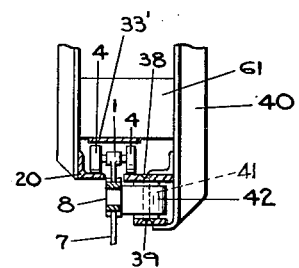
Fig. 5 is a fragmentary sectional view taken along the line V—V of Fig. 4.

To carry the conveyer about a horizontal curve of relatively small radius I have provided the suitable sprocket wheel 9 mounted upon a vertical shaft 36 and positioned in a horizontal plane of the driving chain 8. The shaft 36 is so positioned relative to the track angle that the sprocket wheel 9 affords a guide for the moving parts of the conveyer whereby is prevented friction between the trolley frame 6 and flange 37 of the track angle. Power for the actuation of the conveyer may be applied to the vertical shaft 36 at any such curve. On curves of larger radius, however, the diameter of the required sprocket wheel renders such a construction undesirable and I have provided a more satisfactory arrangement which is illustrated in Figs. 4 and 5 of the drawings. As here shown the track angle at the inner side of the curve is cut away and is replaced by a pair of parallel segmental plates 38 and 39 which are spaced apart vertically and are secured in position in any convenient manner as by the angle bars 40 depending from the supporting structure. At spaced intervals the plates 38 and 39 are pierced by suitable apertures through which extend the pivot pins 41 whereon are rotatably mounted the rollers 42 positioned to engage the chains 8 and trolley bodies 6 to guide them around the curve, the track-wheels 4 meanwhile traveling along the upper surface of the plate 38 which, with the flange 20, forms a continuous trackway.

In Fig. 5 which is a section taken on the line V—V of Fig. 4 looking in the direction of the arrows, a guard plate 33' is mounted above the wheels 4 by being secured to the cross-plate 61 located between the angle bars 40. The guard plate 33' is provided for the same purpose as the guard rail 33.

The present application is a continuation in part of my co-pending application Serial Number 326,381, filed December 15, 1928, for trolley conveyers, as to Figs. 1 to 7, inclusive, and is a continuation in part of my co-pending application Serial Number 275,212, filed May 4, 1928, for trolley conveyers, as to Figs. 8 to 12, inclusive. In Serial Number 275,212, and in Serial Number 326,381, I have described and claimed the various novel features of the trolley conveyer mechanism including the chain and the means for maintaining the wheeled carriages radial of the curve of the track whereas in the present application the claims are directed to the means for suspending the track and to the means for retaining the wheels of the carriage in association with the track.

In Figs. 8 to 12 of the drawings I have shown another embodiment of my invention comprising a plurality of wheeled carriages 6' joined together at spaced intervals by sections of suitable chain 10' to form an endless series to travel along the trackway 20'. The pintles of the chain sections are arranged perpendicularly of the trackway 20' so that the chain links can swing in planes parallel thereto. Each of the carriages 6' comprises a body casting 43 to which is attached two horizontally extending laterally projecting axles 44. Upon each of the axles 44 is journaled a trolley wheel 45, and these wheels rest upon and are adapted to travel along the outwardly projecting flanges 46 of the parallel angle bars 20' of the trackway. The angle bars 20' are reversely arranged and spaced apart with one set of corresponding flanges 46 spaced apart and arranged in the same plane and the other set of flanges 47 arranged in spaced but parallel planes perpendicular to the plane of the flanges 46. These angle bars are supported upon suitable brackets 48 which may be attached to any suitable and convenient support such as the structural members of the building. To the brackets 48 may also be fixed a second pair of angle bars 49 which constitute guard rails above and at the sides of the trolley wheels 45 to prevent their displacement while traveling along runways extending in directions other than horizontal. The angle bars 49 are also reversely arranged like the bars 20' but with their channels facing toward each other instead of facing outwardly away from each other as with the bars 20'.

In the present construction, which is one of many forms the device may assume and is selected merely for illustrative purposes, the hanger body 43, preferably in the form of a casting, is transversely pierced by an aperture positioned between the downwardly extending parallel broad and flat flanges 47 of the angle bars 20', and in this aperture is positioned a vertically disposed axle 50 upon which is journaled a roller 51 arranged directly beneath the axle 44 and adapted to engage the vertical flanges 47 of the trackway to prevent lateral displacement of the carriage. This roller 51 also serves to smoothly guide the carriage along the trackway, materially reducing the vibration which is characteristic of the older constructions.

Formed in the lower portion of the body casting 43 is a longitudinally extending aperture, the relatively broad and flat side walls 52 of which constitute the side bars of a connecting link in the endless chain series of the conveyer. The side walls 52 are pierced by suitably spaced apertures through which extend the pintles 53 and 60 upon which are mounted, for oscillatory movement in vertical planes, the attachment links or clevises 54 and 55. The outer ends of the links 54 and 55 are forked and suitably shaped for connection with the end links 10' of the chain sections 56 by means of vertical pivot pins. Formed on the attachment link 54 is an inwardly projecting bifurcated extension 71 in which is fixed a pintle 58 adapted to engage in a suitable notch formed in the projection 59 of the opposite attachment link 55. These parts are so proportioned and arranged that swinging movement of one of these attachment links about its pivotal support 60 produces an equal and opposite swinging movement of the companion attachment link. By this relative movement of the links 54 and 55 upon the pintles 53 and 60, the chain sections 56 extend from the trolley body 43 in substantially equal angular relation thereto at both sides thereof, thereby tending to hold the body of the carriage 6' substantially radial to the curve of track angles 20' whether these angles extend in horizontal planes or in planes other than horizontal, thereby contributing to the smooth and easy movement of the conveyer.

As is well known in trolley conveyers, the leading and trailing portions of the draft chain on opposite sides of pivotally suspended trolley hangers creates a draft load, the reaction or resultant force of which is normal to the trackway, or in other words, is on a center line extending through the pivot of the hanger and its lower end. In the absence of the inter-engaging means between the links 54 and 55, the trolley hanger in passing about vertical curves, would be forced, by the draft load, out of line with the center line of the trolley which is normal to the trackway and such movement of the hanger would cause the same to rotate about the axis of roller 45, thereby causing bending tendencies of the chain in directions opposed by the chain pintles frequently resulting in damage to the side bars of the chain and clevis links and shearing off of the heads or means for holding the pintles in place. Moreover, such reaction produces considerable binding action between the links and between the trackway and links detrimental to the life of the conveyer. By inter-connecting the links 54 and 55 and thereby causing them to assume corresponding angular relation with respect to the hanger, the resultant force or line of reaction is always maintained normal to the trackway and the foregoing objections to this type of trolley hanger are eliminated or reduced to a very negligible quantity.

The radial relation of the hangers with respect to the track must be maintained both longitudinally and transversely of the track to insure smooth operation of the conveyer. This transverse radial relation is maintained by the rollers 51 engaging the flanges 47 of the track and this maintains the axes of the rollers at right angles to the line of travel to prevent sliding action of the rollers and insure smooth travel of the hangers. The cooperation of the inter-engaging means 59 and 71 and the rollers in maintaining the hangers radial to curves in the track also insures retension of the hangers at right angles to straight portions of the track in passing therealong.

Because of the lateral flexibility of the chain 10', the actuating sprocket wheel is mounted upon a vertical shaft which may be connected in any preferred and convenient manner with any suitable and convenient source of rotative power. This driving element is necessarily placed in a horizontal curve of the trackway where suitable contact may be maintained between the sprocket wheel and the chain 10' to drive it.

Considering the foregoing device from the aspects of a chain alone, it will be appreciated that the hanger body 43, in effect, constitutes a link which pivotally connects the two clevices 54 and 55. If desired, any suitable load carrying device may be associated with this connecting link.

Suspended beneath the carriage body 43, from the transversely extending pivot bolt 62, is a material or load carrying element which may take one of various forms to adapt it to different conditions of service. The material supporting element here illustrated is especially adapted to the transportation of automobile tires and similar articles, and as here shown it consists of a bar 63 pivotally suspended from the bolt 62 and terminating at its lower end in an angularly extending arm 64 which is adapted to engage the inner periphery of an automobile tire 65 to support it. This load supporting bar 63, below its pivotal support 62, is bent as at 66 at an obtuse angle to dispose a part of the bar laterally of the upper portions of the bar 63 and in the same plane therewith. This part at its lower end is provided with a bend 67 in the same direction as the bend 66 to dispose the load supporting arm 64 at an acute angle relative to the upper portion 63 of the bar and in the same vertical plane therewith.

Due to the disposition of the load carrying arm 64 at an acute angle with respect to the upper portion of the bar 63 and the proportion and arrangement of parts disposing the pivot 62 of the arm 63 above the load supporting arm 64 midway of its length, any load placed upon the arm 64 will cause the latter to be disposed in a horizontal plane regardless of whether the load carrying members are moving through horizontal or vertical planes. This arrangement will serve in retaining the load upon the arm 64 and prevent its accidental displacement therefrom. When no load is imposed upon the arms 64, the load carrying elements will seek a new center of gravity and will be disposed so that the load carrying arms 64 are angularly disposed relative to a horizontal plane.

Fixed to the side of the bar 63 and extending in the same direction thereof, is an upwardly projecting arm 68 having a contact roller 69 mounted on a horizontal axis adapted to engage an abutment in the form of a cam 70 fixed to the track structure at the unloading station. During the operation of the conveyer, contact of the roller 69 with the cam 70 produces swinging movement of the bar 63 upon the pivot bolt 62, causing the load carrying arm 64 to be inclined from the horizontal and downwardly at a sufficient angle to drop the tire 65 from the carrier as illustrated in Fig. 11.

By the devices above described, I have produced an improved trolley conveyer adapted to travel over trackways extending in any preferred direction, either in horizontal planes or in planes other than horizontal, without vibration or oscillation, and adapted to automatically discharge its load at a selected one of a plurality of unloading stations.

Various changes in the arrangement, size and shape of the various parts may be resorted to without departing from the spirit of the invention and the scope of the appended claims.

What I claim is:

1. The combination with an overhead track including parallel spaced apart track rails, of means for supporting the same including a C-shaped yoke casting, the inwardly projecting arms of which support said rails, clamping members to secure said track rails to said yoke casting, suspension and bracing rods projecting through apertures of said yoke casting, and nuts screwthreaded to said rods by the adjustment of which vertical adjustment of said track rails can be effected.

2. The combination with an overhead track including two parallel spaced apart track rails curved in a vertical plane; of means for supporting said rails including a yoke casting having inwardly projecting arms to which said track rails are fixed, a guard rail positioned directly above the track rails at said curve, and means to fix said guard rail to said yoke casting.

3. The combination with an overhead track including two parallel spaced apart track rails curved in a vertical plane; of means for supporting said rails including an arched support connected to said rails, a channeled guard rail above said track rails, and means for clamping the flanges of said guard rail in engagement with the arched portion of said support.

4. In a trolley conveyer, the combination with an overhead track, of means for supporting the same comprising a C-shaped yoke having inwardly projecting arms to support said track, suspension and bracing rods connected to said yoke and projecting upwardly therefrom, and means associated with said rods for adjusting the position of said yoke.

5. In a trolley conveyer, the combination with an overhead track, of means for supporting the same including a C-shaped yoke having inwardly projecting arms for supporting said track, and spaced-apart adjustable suspension rods connected to said yoke and projecting upwardly therefrom.

6. In a trolley conveyer, the combination with an overhead track comprising a pair of spaced-apart rails, of means for supporting the track comprising a C-shaped yoke having inwardly projecting arms for supporting said rails in such spaced-apart relation, spaced-apart suspension and bracing rods connected to said yoke and projecting upwardly therefrom, and adjusting means associated with said rods and independently operable to adjust the level of the rails.

7. In a trolley conveyer, the combination with a track, of supporting means therefor, suspension mechanism for said supporting means, and adjusting mechanism associated with said supporting means to vary the height of either side of the track.

8. In a trolley conveyer, the combination with a track having spaced-apart rails, of a support for the track, spaced-apart suspension rods for said support, and separate and independent adjusting means associated with said rods to vary the positions of said rails to bring them into the same horizontal plane.

9. In trolley conveyers, the combination with a track, of a trolley adapted to travel thereon, and a guard spaced above the track in position to maintain the trolley in association with said track along upright curves in the track.

10. In trolley conveyers, the combination with a track comprising spaced-apart rails, of means comprising a C-shaped yoke for supporting said track, and a trolley guard supported within the upper portion of said yoke.

11. In trolley conveyers, the combination with a track comprising spaced-apart angle bars, of a yoke for supporting said track, suspension mechanism for said yoke, a trolley adapted to travel on said track and extend downwardly between said angle bars, and a guard bar extending through the upper portion of said yoke above the trolley.

12. In trolley conveyers, the combination with a track comprising spaced apart angle bars, of a trolley adapted to travel along said tracks and extend downwardly between said angle bars and be confined by the latter against movement laterally off the track, and a guard above the trolley to maintain association of the trolley with the track.

13. In trolley conveyers, the combination with a track, of a support therefor, a trolley adapted to travel on the track, and spaced-apart angle bars connected to said support in spaced-apart relation in position to confine the trolley to its association with said track.

14. In trolley conveyers, the combination with a track comprising spaced-apart angle bars, of a yoke for supporting said angle bars, a trolley having a hanger extending downwardly between said angle bars, and spaced-apart guard angle bars at the upper inner corners of said yoke reversely arranged relative to the track angle bars and in position to confine the trolley to its association with said track.

15. Rail supporting means for use in overhead conveyer installations, said means comprising a substantially C-shaped yoke disposed with its open side downward, and suspension and bracing members in angular relation to each other having their converging lower ends secured to the top portion of the yoke.

16. Rail supporting means for use in overhead conveyer installations, said means comprising a substantially C-shaped yoke disposed with its open side downward, suspension and bracing members in angular relation to each other having their converging lower ends secured to the top portion of the yoke, and means rendering said members independently variable as to effective length whereby to tilt or vertically bodily adjust the yoke.

17. Rail supporting means for use in overhead conveyer installations, said means comprising a substantially C-shaped yoke disposed with its open side downward, and suspension and bracing members having convergent lower threaded ends passed through apertures provided in the upper portion of the yoke with adjustable nuts on said ends engaging the underside of said upper portion.

18. In trolley conveyers, the combination with a track, a support therefor, and a trolley adapted to travel along said track, of means disposed above the trolley and engageable thereby to restrain lifting tendencies thereof.

19. In trolley conveyers, the combination with a track, a support therefor, and a trolley adapted to travel along said track, of a bar disposed above the track in substantially parallel relation thereto and engageable by the trolley to restrain lifting tendencies thereof.

20. In trolley conveyers, the combination with a track, a support therefor, and a wheeled trolley adapted to travel along said track, of a bar disposed above the track in substantially parallel relation thereto and engageable by the tops of the trolley wheels to restrain lifting tendencies thereof.

In testimony whereof I have hereunto set my hand.

EARLE V. FRANCIS.